UNITED STATES PATENT OFFICE.

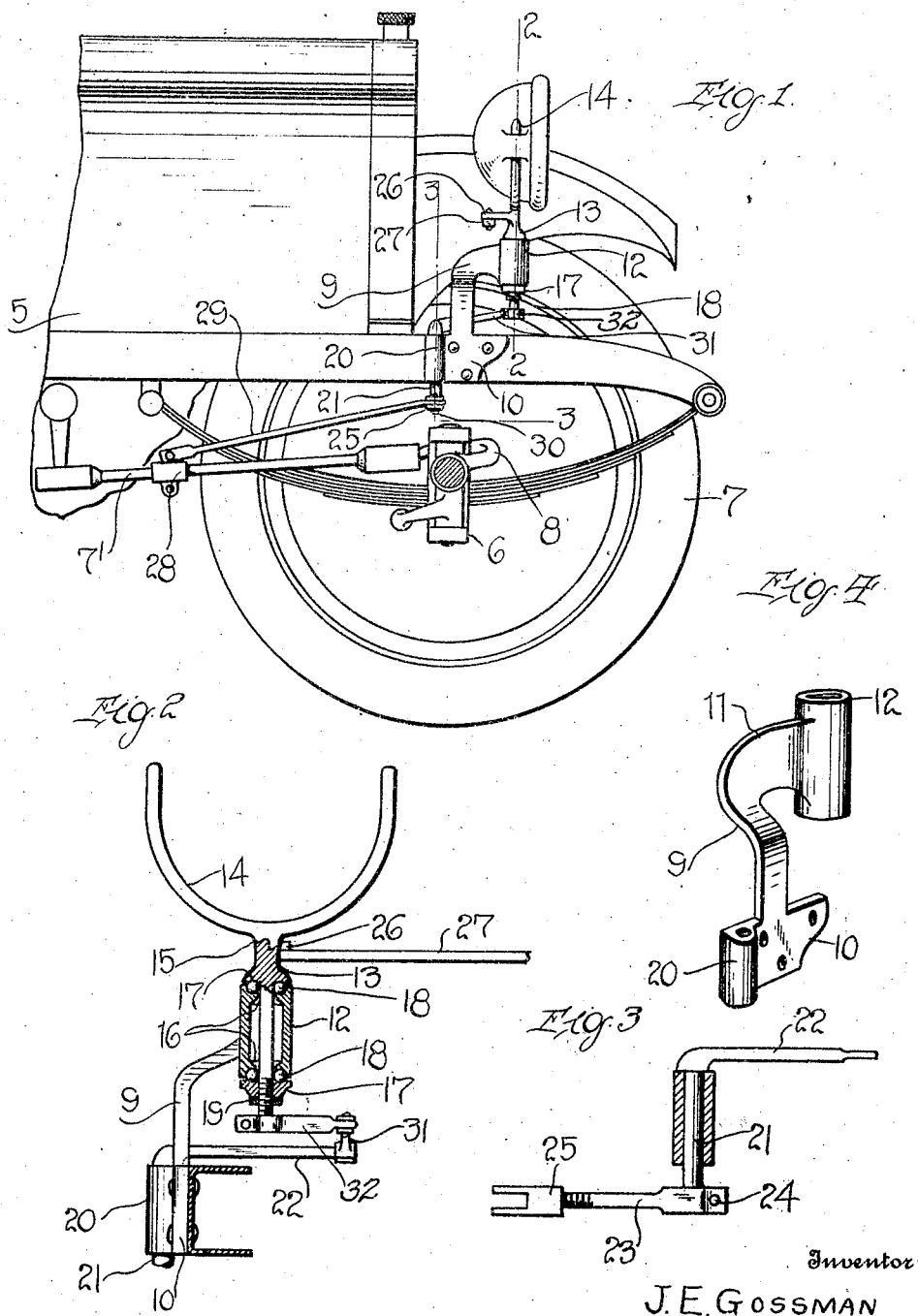

JESSE E. GOSSMAN, OF GOULDS, FLORIDA.

LAMP-OPERATING MECHANISM.

1,105,030.  Specification of Letters Patent.  Patented July 28, 1914.

Application filed February 11, 1914. Serial No. 818,076.

*To all whom it may concern:*

Be it known that I, JESSE E. GOSSMAN, a citizen of the United States, residing at Goulds, in the county of Dade and State of Florida, have invented certain new and useful Improvements in Lamp - Operating Mechanism, of which the following is a specification, reference being had to the accompanying drawings.

This invention relates to a vehicle lamp operating mechanism and more particularly to automatic controlling or operating mechanism for the lamps of automobiles or other selfpropelled vehicles.

The primary object of my invention is to provide a lamp operating mechanism by which the lamps may be simultaneously turned with the turning of the front vehicle wheels so as to throw the light rays in the prevailing direction of travel of the vehicle.

The invention has for another object to provide mechanism for the above purpose which is of very simple form and construction and may be readily applied to automobiles and similar vehicles now in common use without necessitating any material alterations in their construction.

With the above and other objects in view, the invention consists in certain constructions, combinations and arrangement of parts that I shall hereinafter more fully describe and claim.

For a full understanding of the invention, reference is to be had to the following description and accompanying drawings, in which—

Figure 1 is a partial side elevation of an automobile, one of the front wheels being removed to show my improved lamp operating mechanism applied thereto. Fig. 2 is a section taken on the line 2—2 of Fig. 1. Fig. 3 is a section taken on the line 3—3 of Fig. 1. Fig. 4 is a detail perspective view of the lamp supporting bracket.

Referring in detail to the drawing, 5 designates the body of an automobile or other vehicle which is provided with a front axle 6 upon the ends of which the steering wheels 7 are mounted in the usual manner. The knuckles of the steering wheels are connected by a transverse rod so that said wheels are simultaneously turned in the operation of the steering mechanism. This steering mechanism which is of any approved construction now in general use includes the rod 7' which is connected to the steering shaft actuated from the customary steering post. The other end of this rod is pivotally connected to an arm indicated at 8 which is integrally formed with or rigidly secured to one of the steering wheel knuckles. This arrangement of the steering gear is quite common and constitutes no part of the present invention.

My improved lamp controlling and operating mechanism includes a bracket indicated generally by the numeral 9 which consists of an attaching plate 10 adapted to be secured to one of the longitudinal side bars of the chassis or frame of the vehicle. Upon this plate an upstanding vertically disposed arm 11 is formed having a lateral extension terminating in the bearing sleeve 12. This bearing sleeve is adapted to receive the rod or stem 15 of the lamp carrying yoke 14. The opposite ends of the sleeve 12 are provided with ball raceways 16. The rod 15 is formed with an annular shoulder 13 on its upper end and provided with a removable collar 17 on its lower end for engagement with the bearing balls indicated at 18 which are arranged in the respective raceways 16. A lock nut 19 is threaded upon the lower end of the rod or stem 15 to retain the lower bearing collar 17 thereon.

Upon the attaching plate 10 of the lamp supporting bracket, a vertical bearing sleeve 20 is formed for the pivot rod 21. The upper end of this pivot rod is provided with an inwardly extending arm 22. An arm 23 is also adapted to be detachably secured to the lower end of said rod 21 by a suitable clamping member provided upon one end of said arm as at 24. Upon the other end of said arm the member 25 has threaded engagement. It is to be understood that one of the lamp supporting brackets above described is arranged upon each side of the machine frame. Each of the lamp supporting yoke members 14 is formed with an extension 26 to which the ends of a connecting rod 27 are attached. By means of this rod, the lamps are synchronously operated when the machine is steered by the turning of the front wheels.

The rod 7' of the steering mechanism is equipped with a collar shown at 28 which is clamped or otherwise secured thereon. To an ear integrally formed upon this collar one end of a rod 29 is pivotally connected. The other end of said rod is pivotally attached as indicated at 30 to the member 25.

The arm 22 of the pivot rod 21 is connected by means of a rod 31 to an arm 32 which is securely clamped or otherwise rigidly fixed upon the lower end of the post or stem 15 of the lamp supporting yoke 14.

From the foregoing description, taken in connection with the accompanying drawings, it is thought that the construction, manner of operation and several advantages of my invention will be clearly and fully understood. The lamp supporting brackets may be readily attached to the side bars of the machine frame and by simply adjusting the members 25 upon the arms 23, the device may be readily connected to the steering mechanism of various makes of machines through the medium of the rod 29. When the front wheels are turned by the operation of the steering mechanism, it will be obvious that in the movement of the rod 7' connected to the wheel knuckle, the rod 29 is also shifted, and through the medium of the pivot rod 21 and the connections between the same and the lamp carrying yoke, said lamp and the one on the opposite side of the machine through the connection 27 is turned in the direction of the turning movement of the vehicle so that the light rays are at all times thrown directly in front of the vehicle wheels. In this manner liability of serious accidents may be avoided.

From the foregoing description it will be seen that I have produced a very simple, efficient and reliable lamp supporting and controlling mechanism which as a whole is capable of manufacture at small cost and may be easily and quickly applied to the automobile or other vehicle without necessitating any material alterations in its construction. It will be obvious that if desired the several operating parts may be housed within a suitable casing mounted upon the machine frame.

While I have shown and described the preferred embodiment of my invention, it will be understood that the invention is susceptible of considerable modification therein, and I therefore reserve the privilege of resorting to all such legitimate changes as may be fairly embodied within the spirit and scope of the invention as claimed.

What is claimed is:

1. The combination with a vehicle steering mechanism, of lamp supporting brackets secured upon the vehicle frame, lamp carrying yokes mounted in said brackets, a connection between said yokes whereby the lamps are synchronously turned, a pivot rod mounted upon the bracket, connecting means between the said rod and the lamp carrying yoke, and means connecting said pivot rod to the steering mechanism.

2. The combination with a vehicle steering mechanism, of lamp supporting brackets mounted upon the vehicle frame, lamp carrying yokes journaled upon said brackets, connecting means between said yokes, each of said brackets including an attaching plate provided with a bearing sleeve, a vertical rod mounted in the bearing sleeve, arms connected to opposite ends of said rod and extending therefrom in opposite directions with respect to each other, connecting means between the arm on the upper end of said rod and the lamp carrying bracket, and means connecting the arm on the lower end of said rod to the steering mechanism whereby the lamp carrying yokes are turned in the brackets when the steering mechanism is operated.

In testimony whereof I hereunto affix my signature in the presence of two witnesses.

JESSE E. GOSSMAN.

Witnesses:
 A. L. HEARN,
 J. E. JOHNSON.